United States Patent [11] 3,630,008

[72] Inventors Alan E. Revell;
 Wilson A. Welch, both of Louisville, Ky.
[21] Appl. No. 868,872
[22] Filed Oct. 23, 1969
[45] Patented Dec. 28, 1971
[73] Assignee American Air Filter Company, Inc.
 Jefferson County, Ky.

[54] FILTER CELL SEALING AND RETAINING ARRANGEMENT
 2 Claims, 4 Drawing Figs.
[52] U.S. Cl..................................................... 55/493,
  49/489, 55/502
[51] Int. Cl............................................... B01d 25/22
[50] Field of Search......................................... 55/478–481,
  483, 484, 490, 493, 502, 504, DIG. 31;
  277/215, 50, 51; 52/403; 49/485, 489, 490, 479

[56] References Cited
 UNITED STATES PATENTS
2,055,851  9/1936  Pleasant ....................... 49/489
2,765,031  10/1956  Landry ......................... 49/489
2,784,813  3/1957  Secord .......................... 49/489
2,853,153  9/1958  Sexton .......................... 55/481
2,935,157  5/1960  First ............................. 55/483
3,080,950  3/1963  Greene .......................... 49/489
3,140,517  7/1964  Richler ......................... 49/489
3,393,498  7/1968  Schoen .......................... 55/493
3,434,269  3/1969  Hyatt ............................ 55/490
3,507,100  4/1970  Neumann ...................... 55/481
3,383,841  5/1968  Olson et al..................... 55/481

*Primary Examiner*—Frank W. Lutter
*Assistant Examiner*—Bernard Nozick
*Attorney*—Ralph B. Brick ABSTRACT: A sealing and retaining arrangement for a flow-through filter cell housing including a retaining bar slidably mounted on said housing for actuatable movement in both a longitudinal and lateral direction, the filter cell housing having a longitudinally track mounted slidable hollow peripheral seal formed from several sections, at least one of which is compressible and oversize in length to bear firmly against the other.

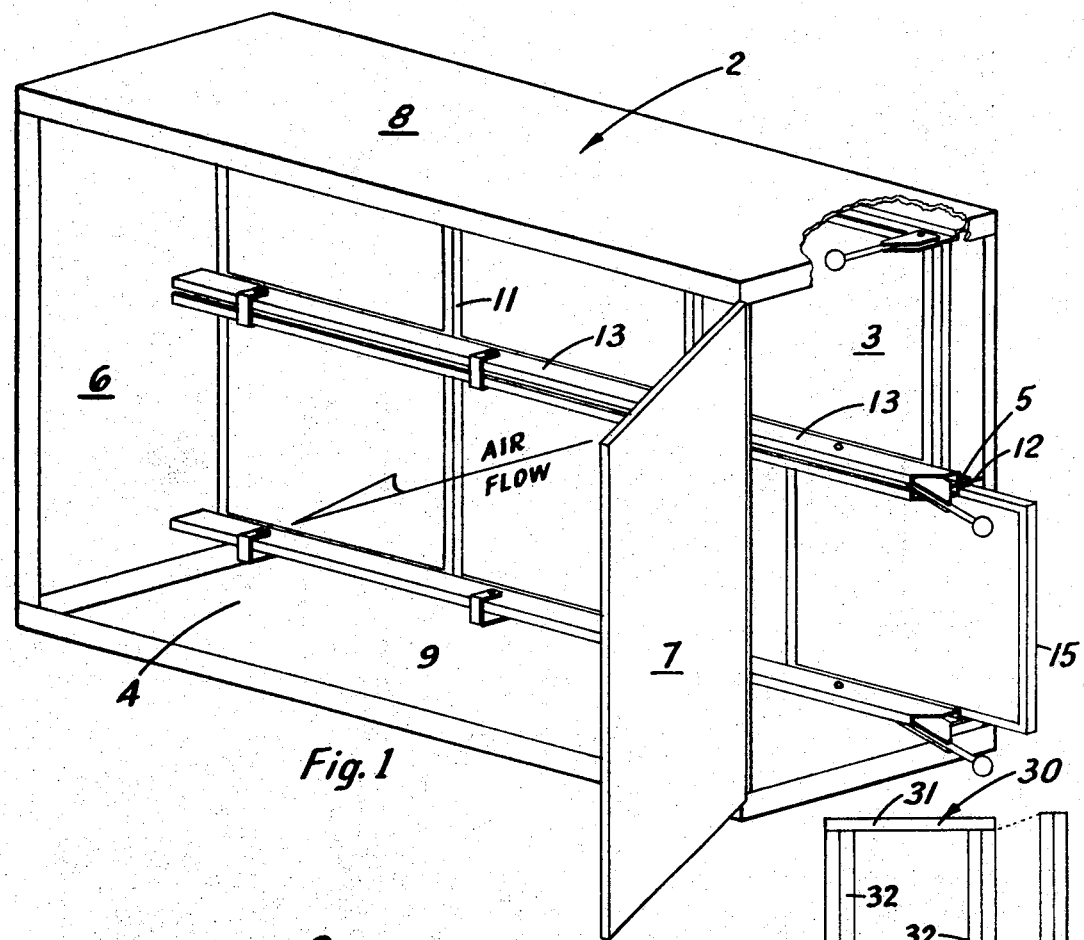
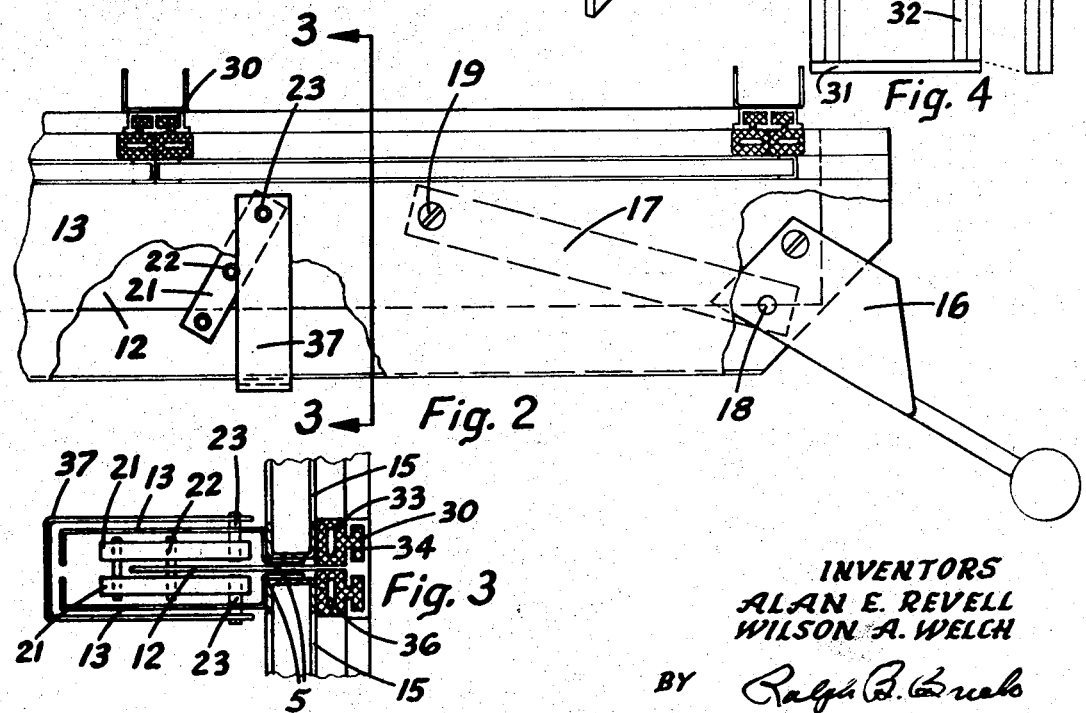
INVENTORS
ALAN E. REVELL
WILSON A. WELCH
BY Ralph B. Burke
ATTORNEY 3,630,008

FILTER CELL SEALING AND RETAINING ARRANGEMENT

BACKGROUND OF THE INVENTION

The present invention pertains to an apparatus for gas separation, and more particularly, to a new, useful and unobvious arrangement for sealing and retaining a filter cell in a filter cell support frame housing.

In the prior art, a number of filter cell sealing and retaining arrangements are known in which a filter cell is firmly held in sealed relation to its support frame structure. These past arrangements of the prior art have included complex screwdown mechanisms, compressible springs slidably pressing directly against the cell frames, and cam and wedging devices —all of which have included several parts and all of which have been complex in manufacture and assembly.

SUMMARY OF THE INVENTION

The present invention, recognizing that the arrangements of the prior art have presented problems in sealing, as well as in construction, installation, wear, and gas stream resistance, provides a novel assembly which is straightforward and economical to manufacture and install, utilizing a minimum of parts and occupying a minimum of space. In addition, the apparatus of the present invention assures effective sealing in an inexpensive manner along the overall peripheral sealing edge to substantially reduce gas leakage.

Various other features of the present invention will become obvious to one skilled in the art upon reading the disclosure set forth hereinafter.

More particularly, the present invention provides, in a flow-through filter cell support housing adapted to receive and support unit filter cell means between the dirty gas inlet and clean gas outlet thereof with the peripheral edge of the filter cell means abutting against a peripheral seal on the support housing, an improved filter cell sealing and retaining means comprising: longitudinally extending sealing and retaining bar means mounted on the support housing for simultaneous slidable movement, both in a direction along its longitudinal axis and in a direction lateral to its longitudinal axis, actuating means connected between the housing and the sealing and retaining bar means to move the bar means in a longitudinal direction along its longitudinal axis and cam means connected between the housing and the sealing and retaining bar means to move the bar means in a lateral sealing and retaining position as the bar means is moved in its longitudinal direction. Further, the present invention provides a sealing arrangement including first and second sections of longitudinally extending sealing members slidably mounted in a track on the filter support housing with at least one of the sections being compressible and oversized in length and longitudinally compressed so that the ends thereof firmly abut against the other section.

It is to be understood that various changes can be made in the arrangement, form, and construction of the apparatus disclosed herein by one skilled in the art without departing from the scope or spirit of the present invention.

Referring to the drawings which disclose one advantageous embodiment of the present invention:

FIG. 1 is a perspective view of an overall support frame incorporating the filter cell sealing and retaining apparatus of the present invention;

FIG. 2 is an enlarged, partially broken away view of the novel aspects of the sealing and retaining arrangement of the present invention;

FIG. 3 is a sectional view in a plane passing through line 3—3 of FIG. 2; and

FIG. 4 is a reduced schematic arrangement of a portion of the novel sealing sections used on the peripheral seal of the present invention.

Referring to FIG. 1 of the drawing, there is disclosed flow-through filter cell support housing 2 having dirty gas inlet 3 and clean gas outlet 4. Housing 2, as disclosed, is rectangular in shape and is formed from spaced opposed vertically extending side panel members 6 and 7 between which are mounted in spaced relation from each other opposed horizontally extending top and bottom panel members 8 and 9, respectively. It is to be noted that side panel 7 is pivotally mounted along one edge thereof to provide a side access door for insertion and removal of filters 15.

Extending across inlet face 3 of housing 2 are a plurality of upper and lower rectangular support frames 11, arranged in upper and lower rows. It is to be understood that frames 11 can be made from several separate frame members welded and joined together or can be made as an integral unit.

Advantageously, the support frames 11 can be made from a suitable cast metal material, such as aluminum, as an integral unit to include horizontally extending upper, lower, and intermediate shelf members 12 extending normally downstream therefrom parallel to and adjacent horizontal peripheral seal sections on housing 2. These sections are described in detail hereinafter. Slidably mounted relative each shelf 12 is a sealing and retaining bar member 13 which extends in longitudinal fashion horizontally across the length of the shelf. Advantageously, two sealing and retaining bar members 13 can be provided, one on either side of the intermediate shelf 12 to accommodate for the sealing of an upper and lower row of filter cells. As can be seen in FIG. 1 of the drawings, each of the sealing and retaining bar members 13 is provided with a longitudinally extending edge 5 of L-shaped cross section adjacent the peripheral sealing sections so that the sealing bar in effect serves as a track means to receive frame 15 therein.

Each sealing and retaining bar 13 is slidably mounted relative its shelf 12 to move both in a direction along its longitudinal axis and in a direction lateral thereto. The actuation of the sealing means along its longitudinal axis is accomplished by means of a pivoted lever arm 16 which is pivotally mounted to shelf 12. A linking bar 17 is pivotally connected for over center movement at one of its ends to lever arm 16 by a bar designated by reference numeral 18 and is connected at its other end to the sealing and retaining bar means 13 by a screw designated by reference numeral 19. To move sealing and retaining bar 13 in a lateral direction, a cam means including cam bar 21 is pivotally connected by a connecting bar designated by reference numeral 22 along its intermediate body portion to shelf 12. The end of cam bar 21 adjacent a peripheral seal section 30 (described hereinafter) is connected to the sealing and retaining bar means by a connecting bar designated by reference numeral 23. Accordingly, when lever arm 16 is actuated, to cause link arm 17 to move sealing and retaining bar 13 along its longitudinal axis in one direction, cam bar 21 connected to sealing and retaining bar 13 at 23 pivots about connecting bar 22 on shelf 12, causing bar 13 to be moved in a lateral direction, either away or toward the peripheral sealing section 30 of support frame 2 in accordance with the longitudinal direction in which sealing and retaining bar 13 is moved. Thus, in an efficient, straightforward manner, a unit filter cell can be mounted on the longitudinally extending shelf edge 5 of a sealing bar 13, and the lever arm 16 actuated, causing the sealing bar 13 to move longitudinally as well as laterally by means of the cam action to force the sealing and retaining bar 13 into retaining position against filter cell 15 carried in its track 5. The filter cell in turn engages against peripheral seal 30.

In accordance with another feature of the present invention, it is to be noted in FIG. 4 of the drawings that the peripheral seal 30 as disclosed is rectangular in shape to include first and second sections composed of opposed pairs of compressible, longitudinally extending spaced sealing strips 31 and 32, respectively, double strips being disclosed at 32. These sealing strips each include a body portion 33 and a tongue portion 34 integral therewith which tongue portion is slidably mounted in a groove or track integral with support housing 2. Sealing pairs 31 and 32 are so arranged that the opposite ends of each of seals 32 abut against the opposed sides of seals 31, seals 32 being sized greater in length than the spacing between seals 31 and being longitudinally compressible so that the ends thereof firmly abut against the opposed sides of seals 31 to avoid leakage of any gases around the overall seal.

It is to be further noted that the bodies of the seals are hollow as at 36, and that the seals are of rectangular cross section. Accordingly, when the seals are compressed, they tend to give at the portion intermediate the lateral sides, thus forcing and compressing material along the side edges to insure knifelike contact between the filter cell and the seal.

Finally, it is to be noted in FIG. 3 of the drawing that a U-shaped strap 37 is connected at its leg extremities to connecting bar 23 to extend in a restraining fashion along the faces of the two restraining bars 13 on either side of intermediate shelf 12.

The invention claimed is:

1. In a flow-through filter cell support housing adapted to receive and support unit filter cell means between a dirty gas inlet passage and a clean gas outlet passage thereof with a peripheral edge of said filter cell means abutting against a peripheral seal mounted on said support housing adjacent one of said passages, an improved filter cell sealing and retaining means comprising: sealing and retaining bar means extending longitudinally relative to and spaced from said one passage of said support housing having a peripheral seal adjacent thereto to receive said filter cell means therebetween, said sealing and retaining bar means being mounted on said support housing for simultaneous slidable movement both in a direction along its longitudinal axis and in a direction lateral to said longitudinal axis toward said one passage to urge said filter cell means against said peripheral seal on said support housing, actuating means connected between said housing and said sealing and retaining bar means to move said bar means in a longitudinal direction along its longitudinal axis, said actuating means comprising a lever arm pivotally mounted to said housing about a first pivot point means and a linking bar pivotally connected at one end to said lever for over center movement about said first pivot point means to a cell retaining position and connected at the opposite end to said sealing and retaining bar means; and cam means connected to and between said housing and said bar means to move said bar means in a lateral locked optimum sealing and retaining position relative said inlet as said bar means is moved in a longitudinal direction, and a rectangularly shaped grooved track system on said support housing to surround the periphery of said one passage having a peripheral seal adjacent thereto, said peripheral seal on said support housing being rectangular in shape and including first and second pairs of opposed spaced sealing strips slidably mounted in coextensive relation in said rectangularly shaped grooved track system on said support housing with the opposite ends of said first pair of strips abutting opposed sides of second pair of strips, said first pair of strips being compressible and sized greater in length than the spacing between said second pair of strips and being longitudinally compressed so that the ends thereof firmly abut against said opposed sides of said second pair of strips.

2. In a flow-through filter cell support housing adapted to receive and support unit filter cell means between a dirty gas inlet passage and a clean gas outlet passage thereof with a peripheral edge of said filter cell means abutting against a peripheral seal mounted on said support housing adjacent one of said passages, an improved filter cell sealing and retaining means comprising: sealing and retaining bar means extending longitudinally relative to and spaced from said one passage of said support housing having a peripheral seal adjacent thereto to receive said filter cell means therebetween, said sealing and retaining bar means being mounted on said support housing for simultaneous slidable movement both in a direction along its longitudinal axis and in a direction lateral to said longitudinal axis toward said one passage to urge said filter cell means against said peripheral seal on said support housing, actuating means connected between said housing and said sealing and retaining bar means to move said bar means in a longitudinal direction along its longitudinal axis, said actuating means comprising a lever arm pivotally mounted to said housing about a first pivot point means and a linking bar pivotally connected at one end to said lever for overcenter movement about said first pivot point means to a cell retaining position and connected at the opposite end to said sealing and retaining bar means; and cam means connected to and between said housing and said bar means to move said bar means in a lateral locked optimum sealing and retaining position relative said one passage as said bar means is moved in a longitudinal direction, said support housing being additionally defined as having at least one shelf member extending normally therefrom adjacent said peripheral seal on said support housing to slidably support said sealing and retaining bar means, said lever arm of said actuating means being pivotally mounted to said shelf member, said cam means including a cam bar pivotally connected along its intermediate body portion to said shelf member and at one end to said sealing and retaining bar means; and a strap member connected to that end of said cam bar which is connected to said sealing and retaining bar means to extend in a restraining fashion along the face of said sealing and retaining bar member.

\* \* \* \* \*